United States Patent [19]
Grenell

[11] 4,288,110
[45] Sep. 8, 1981

[54] END FITTINGS FOR FLEXIBLE METALLIC CONDUITS

[75] Inventor: David Grenell, Laurelton, N.Y.

[73] Assignee: Allen-Stevens Corp., Woodside, N.Y.

[21] Appl. No.: 82,717

[22] Filed: Oct. 9, 1979

[51] Int. Cl.³ .............................................. F16L 33/24
[52] U.S. Cl. .................................. 285/174; 285/247; 285/251; 285/259
[58] Field of Search ................. 285/247, 251, 259, 174

[56] References Cited

U.S. PATENT DOCUMENTS

| | | | |
|---|---|---|---|
| 1,266,416 | 5/1918 | Davis | 285/251 X |
| 1,698,195 | 1/1929 | Karbowski | 285/251 |
| 2,883,513 | 4/1959 | Schnabel | 285/247 X |
| 3,791,680 | 2/1974 | Cleare | 285/174 |
| 3,902,745 | 9/1975 | Mooney et al. | 285/247 |
| 3,921,297 | 11/1975 | Vit | 285/174 X |

FOREIGN PATENT DOCUMENTS

| | | | |
|---|---|---|---|
| 868792 | 4/1971 | Canada | 285/174 |
| 562716 | 7/1944 | United Kingdom | 285/247 |

*Primary Examiner*—Thomas F. Callaghan
*Attorney, Agent, or Firm*—Kirschstein, Kirschstein, Ottinger & Cobrin

[57] ABSTRACT

An end fitting for a flexible metallic conduit comprises a tubular body having an external thread to enable the body to be screwed into an end of a conduit, a tubular sleeve having an external thread to enable the end fitting to be threadedly mounted on a support, and a rotary tubular collar threadedly mounted on a stationary projection of one-piece with the body. The collar has an inner circumferential tapered surface which bounds a wedge-shaped annular space with the externally threaded end of the body. The conduit is received in wedged, moisture-resistant engagement in the space. A stressed O-ring seal between the sleeve and the stationary projection provides another moisture-resistant seal.

8 Claims, 1 Drawing Figure

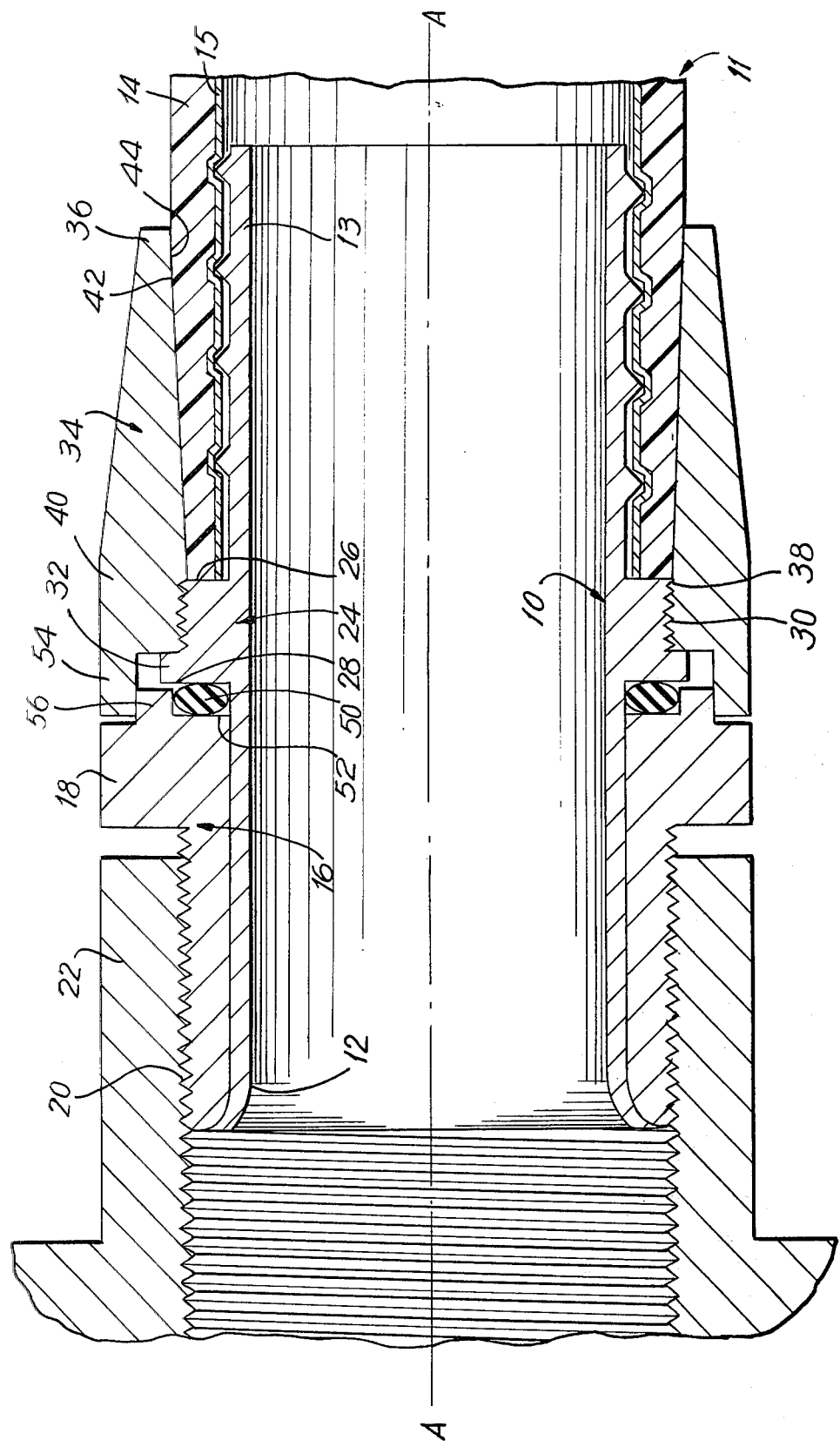

END FITTINGS FOR FLEXIBLE METALLIC CONDUITS

BACKGROUND OF THE INVENTION

1. Field of the Invention

The present invention relates generally to end fittings for flexible metallic conduits in which electric cables are received and, more particularly, to improvements in protecting such end fittings from deleterious environmental conditions such as moisture.

2. Description of the Prior Art

End fittings for flexible plastic-coated, liquid-tight metallic conduits are well known and have been described, for example, in U.S. Pat. No. 3,791,680. The end fitting typically comprises a tubular body having an externally threaded end adapted to be screwed into an end of a flexible metallic conduit. A sleeve having an externally threaded portion is mounted on the other end of the tubular body, and is screwed into a female threaded metallic support structure. A tubular collar is mounted on the body and concentrically surrounds the externally threaded end thereof to define an annular space therewith in which the conduit end is received. In order to prevent ingress of water into the conduit, an O-ring seal is mounted between the sleeve and the collar, as well as providing an annular projection on the interior of the collar for engagement with the exterior plastic surface of the conduit within the annular space.

Although generally satisfactory for their intended purpose, it has been found that the prior art end fittings are not sufficiently protected from water damage. The collar projection does not reliably prevent moisture from entering the interior of the conduit. Moreover, the O-ring seal likewise does not adequately prevent ingress of water into the conduit because the seal is moved when the collar is rotated. The disturbance of the O-ring seal during the collar movement and the resulting wear of the O-ring exposes the interior of the conduit to moisture.

SUMMARY OF THE INVENTION

1. Objects of the Invention

Accordingly, it is the general object of this invention to overcome the drawbacks of the prior art.

It is a further object of this invention to reliably prevent the ingress of moisture into the interior of the conduit, particularly during rotation of the collar.

It is another object of this invention to provide an end fitting whose O-ring seal is not disturbed by movement of the collar.

It is still another object of this invention to provide an end fitting which is inexpensive to manufacture, easy-to-use and light-in-weight.

2. Features of the Invention

In keeping with these objects and others which will become apparent hereinafter, one feature of the invention resides, briefly stated, in an end fitting for a flexible, plastic-coated, fluid-tight, metallic conduit, which comprises a tubular metallic body, a tubular metallic sleeve, a tubular metallic collar, and a resilient sealing means, such as an O-ring seal.

The tubular body is elongated along a longitudinal axis. One end portion of the body is radially outwardly flared. The opposite end portion of the body is threaded for threadedly engaging the flexible metallic conduit. A radially outwardly extending stationary projection is fixedly anchored intermediate the end portions of the body for non-movement relative thereto.

The tubular sleeve concentrically surrounds and is rotatably mounted on the body between the stationary projection and the flared end portion. The sleeve has a threaded end portion for threadedly engaging a support, and an opposite abutment end portion which is axially spaced from the stationary projection.

The tubular collar concentrically surrounds the threaded body end portion. The collar is threadedly mounted on the stationary projection for continuous, adjustable, axial movement relative thereto. The collar has an inner circumferential tapered surface which converges towards the longitudinal axis, as considered in direction from the threaded body end portion towards the opposite end portion of the body. The tapered surface bounds a wedge-shaped annular space with the threaded body end portion, thereby receiving the conduit in wedged engagement in the space. The tapered surface sealingly and clampingly engages the outer plastic surface of the conduit for preventing ingress of moisture into the latter.

The O-ring seal is located between and sealingly engages both the stationary projection and the abutment end portion, and provides a liquid-resistant seal between the body and the sleeve throughout the entire range of movement of the collar. The seal is stressed for firmly urging the sleeve away from the stationary projection and into electro-mechanical engagement with the flaring end portion of the body.

Hence, in accordance with this invention, the O-ring seal between the stationary projection and the sleeve is not disturbed or broken by the movement of the collar. The O-ring will therefore not be subjected to increased wear, and a highly efficient liquid-tight seal is obtained.

In acccordance with another feature of this invention, the tapered inner circumferential surface causes the end of the plastic-coated conduit to be uniformly constricted about its entire circumference. The resulting very broad area of surface-to-surface engagement provides a highly satisfactory water seal past which fluids cannot pass.

Still another feature of the invention is embodied in the mounting of the collar on the stationary projection for continuous axial movement relative thereto. Hence, the position of the collar relative to the conduit can be adjustably set with fine precision, rather than by the coarse adjustments presently existing in the art.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a cross-sectional elevational view of a preferred embodiment of an end fitting in accordance with the present invention, together with a sectional side view of an end of a flexible metallic conduit on which the end fitting is to be mounted, as well as a sectional side view of a support on which the end fitting is to be mounted.

DETAILED DESCRIPTION OF THE PREFERRED EMBODIMENTS

Referring now to the single FIGURE, the end fitting comprises a metallic cylindrical tube or tubular body 10 which is to be threaded into an end of a flexible liquid-tight metallic conduit 11 for carrying electric cables. The tubular body 10 is elongated along a longitudinal axis A—A and has a radially outwardly flaring end portion 12, and an opposite externally threaded end portion 13. The externally threaded portion 13 threadedly engages an end of the flexible metallic conduit 11. The conduit 11 has an outer sleeve 14 of a deformable electrically-insulated material such as plastic or rubber and a corrugated inner flexible, metallic tube 15. The inner tube 15 is conveniently formed by helically winding a longitudinally corrugated metal strip onto a mandrel so that adjacent edges of the strip overlap one another. The overlapped edges have flanges which are folded over to provide a continuous seamed joint.

A tubular metallic sleeve or cylindrical ferrule 16 concentrically surrounds and is rotatably mounted on the flaring end portion 12. The annular sleeve 16 has a hexagonal head 18 at its inner end, and an externally threaded portion 20 at its opposite outer end. The externally threaded portion 20 threadedly engages a metallic support 22 in order to mount the end fitting thereon. The radially outwardly flaring end portion 12 engages the outer face of the externally threaded portion 20 of the sleeve in order to retain the sleeve 16 on the tubular body 10.

A radially outwardly extending stationary projection 24 is fixedly anchored on the tubular body 10 intermediate its opposite end portions 12, 13. The stationary projection 24 concentrically surrounds the tubular body and is circumferentially-complete. The annular stationary projection is constituted of one-piece with the body 10 and cannot move relative thereto in any direction. The stationary projection 24 has an inner wall 26 which faces towards the conduits 11, an outer abutment wall 28 which faces towards the sleeve 16, an externally threaded collar-mounting portion 30, and a stop shoulder 32 between the collar-mounting portion 30 and the abutment wall 28.

A tubular metallic cylindrical collar 34 concentrically surrounds the externally threaded portion 13 of the body. The collar 34 has a free end section 36 at one end, a hexagonal head portion 40 at its other end, and an intermediate threaded section 38 for threadedly engaging the collar-mounting portion 30. The collar is thus adjustably mounted on the stationary projection 24 for infinitely variable continuous movement in the axial direction relative to the body 10 in order to thread the conduit 11 on to the body 10.

The collar 34 has an interior circumferential wall or surface 42 which surrounds the externally threaded end portion 13 of the body and bounds therewith an annular space 44 in which the conduit is received. The interior circumferential wall 42 is tapered and converges continuously in the direction from the outer free end collar section 36 to the inner threaded collar-mounting section 38. The tapered wall 42 extends linearly towards the longitudinal axis as considered in direction from the externally threaded end 13 of the body towards its opposite flaring end portion 12. The annular space 44 is wedge-shaped in cross-section.

In use, the end fitting is mounted on the conduit 11 by offering the externally threaded end 13 of the body to the end of the conduit 11, and thereafter by simply rotating the collar 34 in the appropriate direction about the longitudinal axis A—A to bring the threaded end 13 into engagement with the convolutions of the inner tube 15 of the conduit 11. As the collar advances in axial direction towards the conduit 11, the tapered circumferential wall 42 circumferentially engages and constricts the deformable wall 14. The tapered wall 42 clamps about the entire outer deformable surface of the conduit and deforms the latter radially inwardly in order to clampingly and sealingly engage the conduit. The more fully the end fitting is screwed home, the greater is the degree of radially inward deformation, and the tighter is the moisture-resistant seal between the collar 34 and the conduit 11. As shown, there is a broad contact area of mutual surface-to-surface engagement between the inner circumferential wall of the collar and the outer circumferential wall of the conduit 11, thereby reliably preventing ingress of moisture into the conduit.

Another moisture-resistant seal is provided between the sleeve 16 and the body 10. A resilient sealing means, preferably an O-ring seal 50, is located between the abutment face 28 on the stationary projection 24 and an abutment end face 52 on the sleeve 16. The O-ring seal 50 and the sleeve 16 are mounted on the body 10 by sliding these components over the body end 12 before the latter is deformed by flaring. Axially-directed pressure is then applied to the O-ring so as to slightly compress the latter and to urge the two juxtaposed abutment faces 52, 28 towards each other. The body end 12 is thereupon swaged over to retain the sleeve on the body, as well as to maintain a constant axially-directed pressure on the O-ring. The O-ring is preferably constituted of elastomeric resilient material, and the stressed O-ring thus inherently generates its own oppositely-directed restoring force in order to return itself to its initial unstressed condition. This restoring force urges the sleeve against the flaring end 12, thereby improving the electromechanical and moisture-resistant contact therewith. This mutual contact is affirmatively and reliably maintained no matter to what position the collar 34 is moved. When the collar 34 is turned, the stationary projection 24 does not move in either the circumferential or the axial directions.

As for the sleeve 16, this likewise does not move when the collar 34 is turned. In the non-use or storage condition, the stop shoulder 32 limits rearward movement of the collar. The collar 34 also has a rear annular flange 54 which is mounted in slip-fit engagement with the front annular flange 56 of the sleeve. When the collar is turned, the flanges 54, 56 slip relative to each other, thereby insuring that the O-ring seal is not affected by the collar movement and remains fluid-tight.

In a preferred embodiment, the metallic parts of the end fitting are manufactured of a die-cast zinc-based material such as Zamac which is an alloy comprised of zinc, aluminum and copper.

The tapered inner circumferential wall 42 is inclined relative to the longitudinal axis and includes therewith a tapered angle which preferably lies in the range of from about 2° to about 9°. A 2° tapered angle is currently preferred.

It will be understood that each of the elements described above, or two or more together, may also find a useful application in other types of constructions differing from the types described above.

While the invention has been illustrated and described as embodied in end fittings for flexible metallic conduits, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended:

1. An end fitting for a flexible metallic conduit having an outer deformable wall in which electric cables are received, comprising:
    (a) a tubular metallic body elongated along a longitudinal axis and bounding an interior in which the electric cables are received, said body having a radially outwardly flaring end portion and an opposite threaded end portion for threadedly engaging the flexible metallic conduit, said body having a radially outwardly extending stationary projection which is fixedly anchored on said body for non-movement relative thereto intermediate the end portions thereof;
    (b) a tubular metallic sleeve concentrically surrounding and being rotatably mounted on said body between said stationary projection and said flared end portion, said sleeve having a threaded end portion for threadedly engaging a support, and an opposite abutment end portion which is axially spaced from said stationary projection;
    (c) a tubular metallic collar concentrically surrounding said threaded end portion of said body and having an inner circumferential surface which bounds therewith an annular space in which the flexible metallic conduit is received, said collar being threadedly mounted on said stationary projection for continuous adjustable axial movement relative thereto; and
    (d) resilient sealing means located between and sealingly engaging both said stationary projection and said abutment end portion, said stationary projection being non-movable relative to said resilient sealing means for providing a wear-and fluid-resistant seal between said body and said sleeve to thereby protect the electric cables, said resilient sealing means being stressed for affirmatively urging said sleeve away from said stationary projection and into electro-mechanical engagement with said flaring end portion of said body.

2. The end fitting as defined in claim 1, wherein said collar has an inner threaded section mounted on said stationary projection, and an outer free end section spaced axially from said threaded section; and wherein said inner circumferential surface of said collar is tapered and converges continuously in a longitudinal direction from said outer free end section to said inner threaded section, thereby wedging the outer deformable wall of the flexible metallic conduit in said annular space between said tapered inner circumferential surface and said threaded end portion of said body.

3. The end fitting as defined in claim 2, wherein said tapered inner circumferential surface is inclined relative to the longitudinal axis at an angle which lies in a range from about 2° to about 9°.

4. The end fitting as defined in claim 1, wherein said stationary projection is of one-piece with said body.

5. The end fitting as defined in claim 1, wherein said body has a stop on said stationary projection for limiting axial movement of said collar.

6. The end fitting as defined in claim 1, wherein said resilient sealing means is an O-ring seal.

7. The end fitting as defined in claim 1, wherein said collar is constituted of die-cast zinc-based material.

8. An end fitting for a flexible metallic conduit having an outer deformable wall in which electrical cables are received, comprising:
    (a) a tubular metallic body elongated along a longitudinal axis and bounding an interior in which the electric cables are received, said body having a radially outwardly flaring end portion and an opposite threaded end portion for threadedly engaging the flexible metallic conduit, said body having a radially outwardly extending stationary projection which is fixedly anchored on said body for non-movement relative thereto intermediate the end portions thereof;
    (b) a tubular metallic sleeve concentrically surrounding and being rotatably mounted on said body between said stationary projection and said flaring end portion of said body, said sleeve having a threaded end portion for threadedly engaging a support, and an opposite abutment end portion which is axially spaced from said stationary projection;
    (c) a tubular metallic collar concentrically surrounding said threaded end portion of said body, said collar being threadedly mounted on said stationary projection for continuous adjustable axial movement relative thereto, said collar having an inner circumferential tapered surface which converges continuously towards the longitudinal axis as considered in direction from said threaded end portion of said body towards its opposite flaring end portion, said tapered inner circumferential surface being inclined relative to the longitudinal axis at an angle which lies in a range from about 2° to about 9°, said inner circumferential tapered surface bounding a wedge-shaped annular space with said threaded end portion of said body to thereby deformably receive the outer deformable wall of the flexible metallic conduit in wedged engagement in said space, said tapered surface sealingly and clampingly engaging the outer deformable wall of the flexible metallic conduit for preventing ingress of fluids into the latter; and
    (d) resilient sealing means located between and sealingly engaging both said stationary projection and said abutment end portion, said stationary projection being nonmovable relative to said resilient sealing means for providing a wear-and fluid-resistant seal between said body and said sleeve to thereby protect the electric cables, said resilient sealing means being stressed for affirmatively urging said sleeve away from said stationary projection and into electro-mechanical engagement with said flaring end portion of said body.

* * * * *